(12) United States Patent
Vivanco

(10) Patent No.: US 9,071,984 B1
(45) Date of Patent: Jun. 30, 2015

(54) MODIFYING A DATA FLOW MECHANISM VARIABLE IN A COMMUNICATION NETWORK

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

(*) Notice: Subject to any disclaimer, the term of this patent is extended or adjusted under 35 U.S.C. 154(b) by 105 days.

(21) Appl. No.: 13/768,827

(22) Filed: Feb. 15, 2013

(51) Int. Cl.
  *G01R 31/08* (2006.01)
  *H04J 1/16* (2006.01)
  *H04J 3/14* (2006.01)
  *H04L 1/00* (2006.01)
  *H04L 12/26* (2006.01)
  *H04W 28/02* (2009.01)

(52) U.S. Cl.
  CPC .................................. *H04W 28/0231* (2013.01)

(58) Field of Classification Search
  CPC ...................................................... H04L 12/24
  See application file for complete search history.

(56) References Cited

U.S. PATENT DOCUMENTS

| | | | |
|---|---|---|---|
| 7,953,064 B2* | 5/2011 | Ahluwalia | 370/349 |
| 2004/0013089 A1* | 1/2004 | Taneja et al. | 370/235 |
| 2009/0190471 A1* | 7/2009 | Mahendran et al. | 370/230.1 |
| 2011/0242979 A1* | 10/2011 | Feroz et al. | 370/235 |
| 2011/0296064 A1 | 12/2011 | Ehsan et al. | |
| 2014/0022904 A1* | 1/2014 | Ahmad et al. | 370/235 |

FOREIGN PATENT DOCUMENTS

WO   WO 2007038750 A1 *   4/2007

* cited by examiner

*Primary Examiner* — Andrew Chriss
*Assistant Examiner* — Voster Preval

(57) ABSTRACT

Systems and methods of monitoring communications in a communication network are provided. A rate of overhead messages received from a wireless device is monitored and compared to a predetermined threshold. When the rate of the overhead messages received exceeds the predetermined threshold, a type of application operating on the wireless device is identified. A congestion control mechanism mode is determined when the rate of overhead messages received exceeds the predetermined threshold. A variable of a data flow mechanism is modified based on the type of application operating on the wireless device and the congestion mechanism mode.

20 Claims, 6 Drawing Sheets

MODIFYING A DATA FLOW MECHANISM VARIABLE IN A COMMUNICATION NETWORK

TECHNICAL BACKGROUND

In computer networks, such as the Internet, information can be transmitted using Transmission Control Protocol (TCP) and Internet Protocol (IP). TCP/IP protocols provide end-to-end communications throughout the network. Overhead messages can be used in TCP/IP networks to manage traffic flow within the network. The overhead messages can include control messages such as network routing information. Wireless devices can generate a large number of overhead messages when uploading data to the network.

OVERVIEW

Systems and methods of monitoring communications in a communication network are provided. A rate of overhead messages received from a wireless device is monitored and compared to a predetermined threshold. When the rate of the overhead messages received exceeds the predetermined threshold, a type of application operating on the wireless device is identified. A congestion control mechanism mode is determined when the rate of overhead messages received exceeds the predetermined threshold. A variable of a data flow mechanism is modified based on the type of application operating on the wireless device and the congestion mechanism mode.

DETAILED DESCRIPTION

Figure 1:
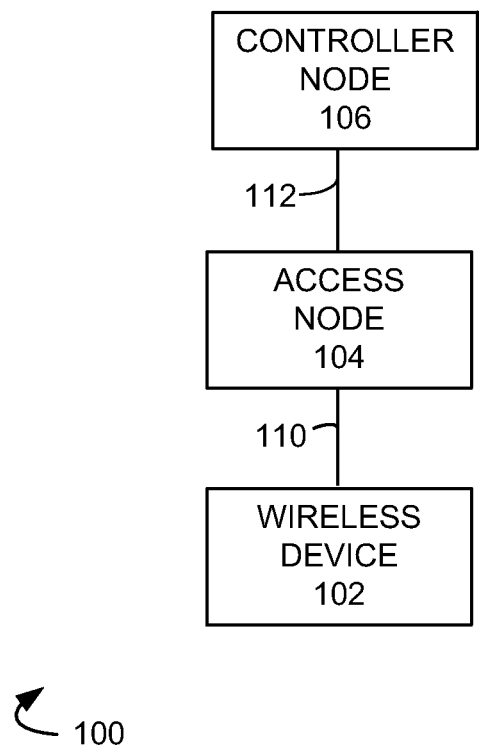
FIG. 1 illustrates an exemplary communication system to monitor communications from a wireless device.

FIG. 1 illustrates an exemplary communication system 100 to monitor communications in a communication network comprising a wireless device 102, an access node 104, and a controller node 106. Other network elements may be present in the communication system 100 to facilitate communication but are omitted for clarity, such as gateways, routers, mobile switching centers, and location registers such as a home location register or visitor location register.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof.

Wireless device 102 is in communication with access node 104 through communication link 110. Link 110 can use various communication media, such as air, space, metal, optical fiber, or some other signal propagation path—including combinations thereof. Communication link 110 may comprise many different signals sharing the same link. Communication link 110 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 110, but be transferred over different communication sessions, frequencies, timeslots, packets, ports, sockets, logical transport links, or in different directions—including combinations thereof.

Access node 104 can be any network node configured to communicate with wireless device 102 and controller node 106. For example, access node 104 can be a base transceiver station, a radio base station, an eNodeB device, or an enhanced eNodeB device.

Access node 104 is in communication with controller node 106 through communication link 112. Communication link 112 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Link 112 can be a direct link or might include various equipment, intermediate components, systems, and networks. Link 112 can include multiple signals operating in a single pathway in a similar manner as wireless link 110.

Although a single access node 104 is illustrated in FIG. 1, wireless device 102 can be in communication with more than one access node. The plurality of access nodes can be associated with different networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

Controller node 106 is a network element in communication with a communication network (not illustrated) and access node 104. Controller node 106 can be any element configured to communicate information over a network or control communication of the information over the network. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), etc. One of ordinary skill in the art would recognize that controller node 106 is not limited to any specific technology architecture, such as Long Term Evolution (LTE) and can be used with any network architecture.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 106 can receive instructions and other input at a user interface.

Numerous applications can be operating on wireless device 102 such that the applications require communications over the communication system 100. When wireless device 102 is in communication with access node 104, data related to the applications can be uploaded to the network from the wireless device 102 and data can be downloaded to the wireless device 102 from the network. During the uploading process, data can be stored in a buffer (not illustrated) of the wireless device 102 until network traffic conditions sufficiently support uploading the data. Overhead messages can be used to schedule buffered data. For example, the wireless device 102 can send a scheduling request to the access node 104 indicating that buffered data is available to be sent. Access node 104 can reply to the scheduling request with a first grant message that requests further scheduling information. In response to the first grant message, the wireless device 102 can send a buffer status report message that includes various information about the buffered data, such as buffer size, stored data size, and logical channel group information. The access node 104 can respond with a second grant message that can specify the amount of resources allocated to the wireless device 102 for uploading data from the buffer. The resource allocation can be based on various factors such as the buffer status report, the quality of service of the network traffic, and/or current radio conditions. Wireless device 102 can upload the buffered data according to the resource allocations during a specified transmission time interval. If more data is stored in the buffer than can be uploaded during the specified transmission time interval, additional overhead messages can be sent to further schedule buffer data uploads.

A congestion control mechanism can be used during the transmission process. For example, a TCP congestion control window can be implemented to control transmission where the congestion control window comprises a slow start mode, a congestion avoidance mode, and a constant rate mode. When the wireless device 102 begins to upload data stored in the buffer, the congestion state of the network is unknown and the congestion control mechanism begins transmitting in a slow start mode. During the slow start mode, one message segment size can be sent at a time. The message segment size can be a predetermined size defined by the network. If an acknowledgement message is received after the one message segment is sent, the congestion window size can be doubled such that two message segment sizes are sent. For every acknowledgment message received, the congestion window size is doubled until a slow start threshold is reached. The slow start threshold can be the delineation between the slow start mode and the congestion avoidance mode of the congestion control mechanism. After the slow start threshold is reached, the size of the congestion window is increased until the maximum window size is reached. The maximum window size can be a predetermined size defined by the network. The maximum window size can be the delineation between the congestion avoidance mode of the congestion control mechanism and the constant rate mode. After the maximum window size is achieved, the transmit window size of the congestion window remains constant during the constant rate mode.

In addition to the congestion control mechanism, a data flow mechanism can be implemented to dictate when traffic can be transmitted from the wireless device 102 to the network. For example, the data flow mechanism can be a token bucket algorithm. The token bucket algorithm can, among other things, allow delivery of buffered packets to and from the wireless device. By the use of a token bucket algorithm, data traffic can be shaped dynamically so that a burst of data, such as buffered data, can be transmitted up to a determined burst rate. By analogy, a token bucket contains tokens, each of which can represent a unit of bytes or a single packet of predetermined size. The number of tokens determines the ability to send a packet, according to a predetermined token threshold, and the more tokens are in the bucket, the greater the permitted data burst, up to a peak data rate. The token bucket can be adjusted according to, among other things, the application requirements, the availability of carrier bands in a network, radio frequency (RF) environment conditions, available modulation and coding schemes, backhaul and/or network congestion, and an amount of data buffered in the access node and/or the aggregation router.

Variables of the token bucket algorithm can be selected to modify the rate at which data is transmitted. For example, variables such as token rate (r), token size (a), and bucket size (b) can be modified in the token bucket algorithm. In one embodiment, when the token rate (r) is set to be small and the token size (a) is set to be large, data can be sent less frequently from the wireless device 102 such that a large amount of transmission resources are requested due to the large group of packets requested to be sent. In another embodiment, when token rate (r) is set to be large and the token size (a) is set to be small, data can be sent more frequently from the wireless device 102 such that a small amount of transmission resources are requested due to the small group of packets requested to be sent. In still another embodiment, the bucket size (b) of the token algorithm and the bucket size (b) can be indicative of the amount of RF resources available to the wireless device. Thus, bucket size (b) can be set such that the amount of resources available to the wireless device 102 for uploading buffered data is maximized.

In operation, an element of communication system 100, such as access node 104 and/or controller node 106 can monitor the rate of overhead messages received for wireless device 102 over the communication network. The rate of the overhead messages received can be compared to a predetermined threshold and when the rate of overhead messages exceeds the predetermined threshold an element of the communication system 100 can identify the type of application running on the wireless device. In addition, when the rate of overhead messages exceeds the predetermined threshold, a congestion control mechanism mode can be determined. Based on the type of application operating on the wireless device and the determined congestion control mechanism mode, a variable of a data flow mechanism can be modified.

Figure 2:
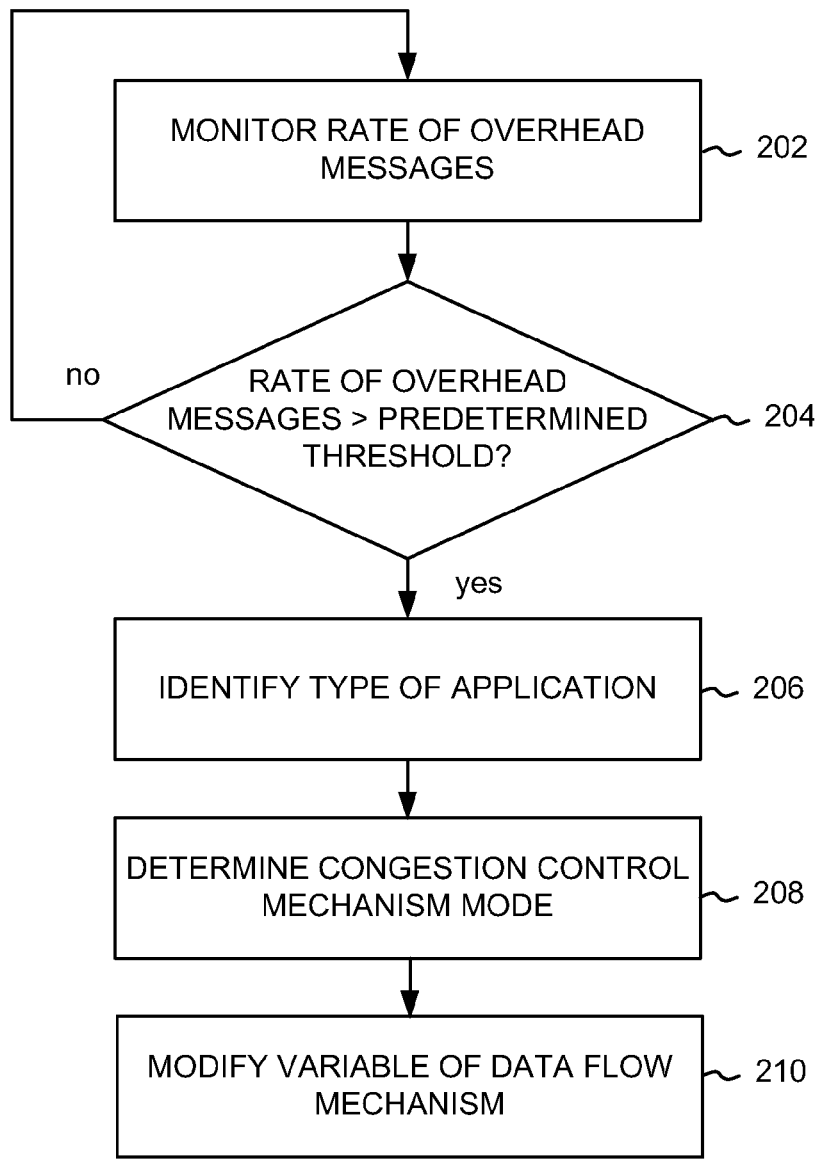
FIG. 2 illustrates an exemplary method of monitoring communications in a communication network.

FIG. 2 illustrates an exemplary method of monitoring communications in a communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Wireless device 102 can send overhead messages when data is stored in a buffer of the wireless device 102 and is waiting to be uploaded to the network. A rate of the overhead messages can be monitored at 202. For example, any of the network elements, such as the access node 104 and/or the controller node 106 can monitor the rate of overhead messages. The overhead message can include any message related to uploading data such as scheduling requests and buffer status reports.

The rate of overhead messages received from the wireless device 102 can be compared to a predetermined threshold at 204. The predetermined threshold can be based on various factors. For example, the predetermined threshold can be based on network traffic, network resources, type of applications operating on the wireless device 102, etc.

When the rate of overhead messages received from the wireless device 102 exceeds the predetermined threshold, the type of application operating on the wireless device 102 can be identified at 206. For example, the type of applications can include best effort applications that use TCP protocol for uploading data. In an exemplary embodiment, the best effort applications can engage in frequent file uploading of messages, pictures, email, etc.

In addition, TCP-flow information can be determined such that a congestion control mechanism mode can be determined in 208. TCP-flow information can include any information relating to the data flow to and from wireless device 102. For example, TCP-flow information can include the type of application operating on the wireless device 102, a TCP congestion window size from the TCP header, an uploading file size, and/or the amount of data already uploaded from the buffer of the wireless device.

At least one variable of a data flow mechanism can be modified at 210 based on the congestion control mechanism mode and the type of application operating on the wireless device 102. For example, a token size, a token rate, a bucket size, and/or a packet generation rate of a token bucket algorithm can be modified.

Depending on the desired outcome, a rate of the overhead messages received by the wireless device can be modified based on the data flow mechanism. For example, the rate of overhead messages can be modified such that the packet delay does not fall below the logout threshold of the network. Alternatively, the rate of overhead messages can remain unchanged when at least one variable of the data flow mechanism is modified.

Figure 3:
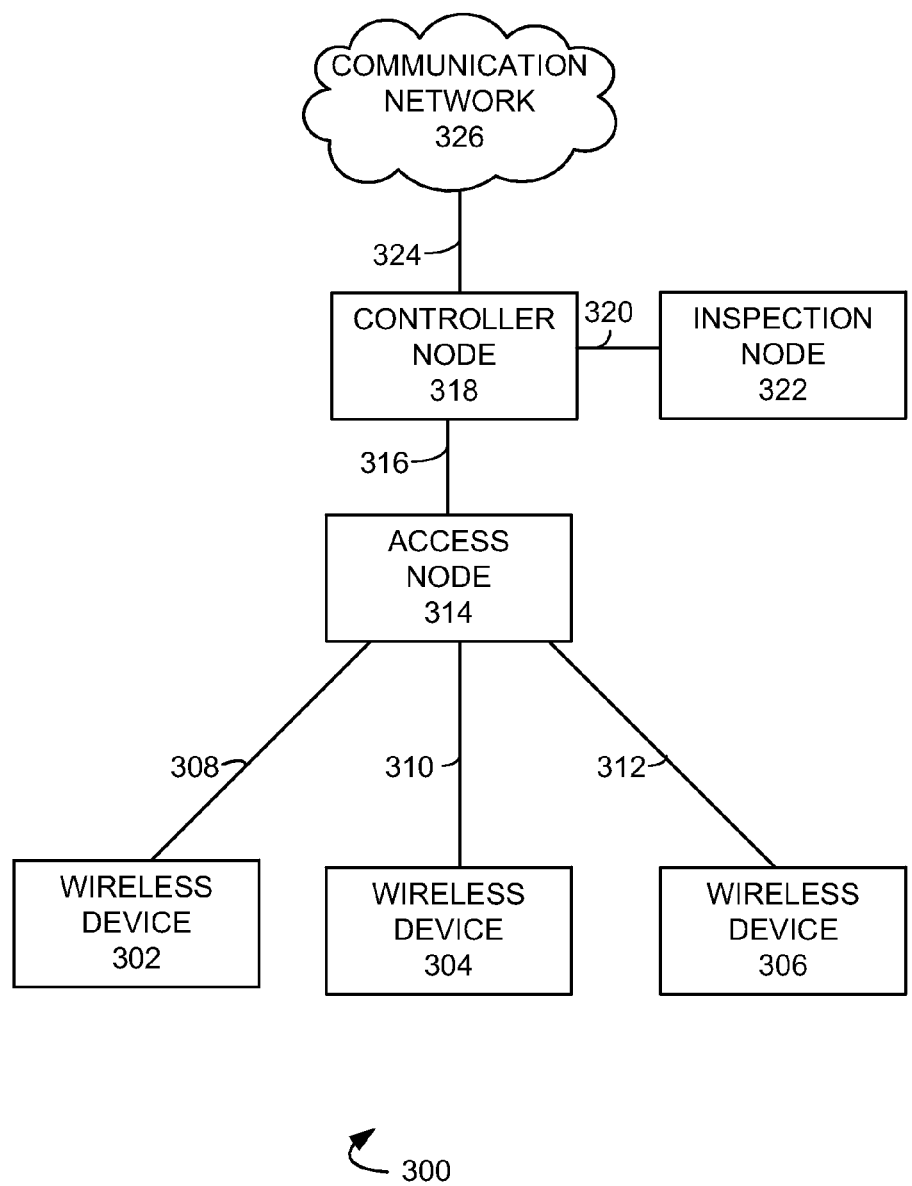
FIG. 3 illustrates another exemplary communication system to monitor communications from a plurality of wireless devices.

FIG. 3 illustrates an exemplary communication system 300 to monitor communications in a communication network comprising a plurality of wireless devices 302, 304, 306, access node 314, controller node 318, inspection node 322, and communication network 326. Other network elements may be present in the communication system 300 to facilitate communication but are omitted for clarity, such as gateways, routers, mobile switching centers, and location registers such as a home location register or visitor location register.

Wireless devices 302, 304, and 306 can be any device configured to communicate over communication system 300 using a wireless interface. For example, wireless devices 302, 304, 306 can include at least one of a cell phone, a smart phone, a computing platform such as a laptop, palmtop, or a tablet, a personal digital assistant, or an internet access device, and combinations thereof. While three wireless devices are illustrated in FIG. 3, any number of wireless devices can be in communication with access node 314.

Wireless device 302 is in communication with access node 314 through communication link 308, wireless device 304 is in communication with access node 314 through communication link 310, and wireless device 306 is in communication with access node 314 through communication link 312. Links 308, 310, and 312 may comprise many different signals sharing the same link. Communication links 308, 310, and 312 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, and 306 and access node 314 could share the same representative wireless links 308, 310, and 312, but be transferred over different communication sessions, frequencies, timeslots, packets, ports, sockets, logical transport links, or in different directions—including combinations thereof.

Access node 314 can be any network node configured to communicate with wireless devices 302, 304, 306 and controller node 318. For example, access node 314 can be a base transceiver station, a radio base station, an eNodeB device, or an enhanced eNodeB device.

Access node 314 is in communication with controller node 318 through communication link 316. Communication link 316 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Link 316 can be a direct link or might include various equipment, intermediate components, systems, and networks. Link 316 can include multiple signals operating in a single pathway in a similar manner as wireless links 308, 310, 312.

Although a single access node 314 is illustrated in FIG. 3, wireless devices 302, 304, 306 can be in communication with more than one access node. The plurality of access nodes can be associated with different networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

Controller node 318 can be any element configured to communicate information over a network or control communication of the information over the network. Controller node 318 can be a standalone computing device, computing system, or network component, and can be accessible, for example, by a wired or wireless connection, or through an indirect connection such as through a computer network or communication network. For example, controller node 318 can include a mobility management entity (MME), a serving gateway (SGW), a public data network gateway (PGW), a Home Subscriber Server (HSS), a Policy Control and Charging Rules Function (PCRF), etc. Controller node 318 is not limited to any specific technology architecture, such as Long Term Evolution (LTE) and can be used with any network architecture.

Controller node 318 can be in communication with inspection node 322 through communication link 320 and communication network 326 through communication link 324. Communication links 320 and 324 can be wired or wireless and use various communication protocols such as Internet, Internet protocol (IF), local-area network (LAN), optical networking, hybrid fiber coax (HFC), telephony, T1, or some other communication format—including combinations, improvements, or variations thereof. Links 320 and 324 can be a direct link or might include various equipment, intermediate components, systems, and networks. Links 320 and 324 can include multiple signals operating in a single pathway in a similar manner as wireless links 308, 310, 312.

Controller node 318 can comprise a processor and associated circuitry to execute or direct the execution of computer-readable instructions to obtain information. Controller node 318 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 318 can receive instructions and other input at a user interface.

Inspection node 322 can be a network node configured to inspect various properties associated with the network. For example, inspection node 322 can, among other things, perform deep packet inspection of packets sent from and/or to wireless devices 302, 304, 306. Deep packet inspection generally involves an inspection of packets beyond Open Systems Interconnection (OSI) layer 3 including an inspection of the data portion of a packet (and possibly also the header of a packet). In an exemplary embodiment, traffic information relating to each wireless device 302, 304, 306 can be determined including types of applications running on each wireless device 302, 304, 306, a TCP congestion window size from a TCP header, an uploading file size, and the amount of data already being uploaded. Inspection node 312 can be for example, a standalone computing device or network element, or the functionality of mode inspection node 322 can be included in another network element, such as a mobility management entity (MME), a gateway, a proxy node, or another network element.

Inspection node 322 can comprise a processor and associated circuitry to execute or direct the execution of computer-readable instructions. Inspection node 322 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Communication network 326 can be any type of network or internetwork. Network 326 may comprise a computer, a network, or a collection of computers and networks that couple, link, or otherwise operatively provide wireless devices 302, 304, 306 with communication service. It should be understood that network 326 may comprise secondary data networks. For example, network 326 may include a backhaul network, a local network, a long distance network, a packet network, or any combination thereof, as well as other types of networks. Network 326 may be or include an access service network (ASN), an access service network gateway (ASN-GW), wireless local access network access gateway (WAG), packet data gateway (PDG), mobile switching center (MSC) and packet data serving node (PDSN).

In operation, an element of communication system 300, such as access node 314, controller node 318, and/or inspection node 322 can monitor the number of overhead messages received from each wireless device 302, 304, 306 over the communication network. The number of overhead messages received from each wireless device 302, 304, 308 can be compared to a predetermined threshold and when the number of overhead messages from each wireless device exceeds the predetermined threshold, an element of the communication system 300 can identify the type of application running on each of the wireless devices 302, 304, 306. In addition, when the number of overhead messages exceeds the predetermined threshold, a congestion control mechanism mode can be determined for each wireless device 302, 304, 306. Based on the type of application operating on each wireless device 302, 304, 306 and the determined congestion control mechanism mode for each wireless device 302, 304, 306, a variable of a data flow mechanism can be modified for each wireless device 302, 304, 306.

Figure 4:
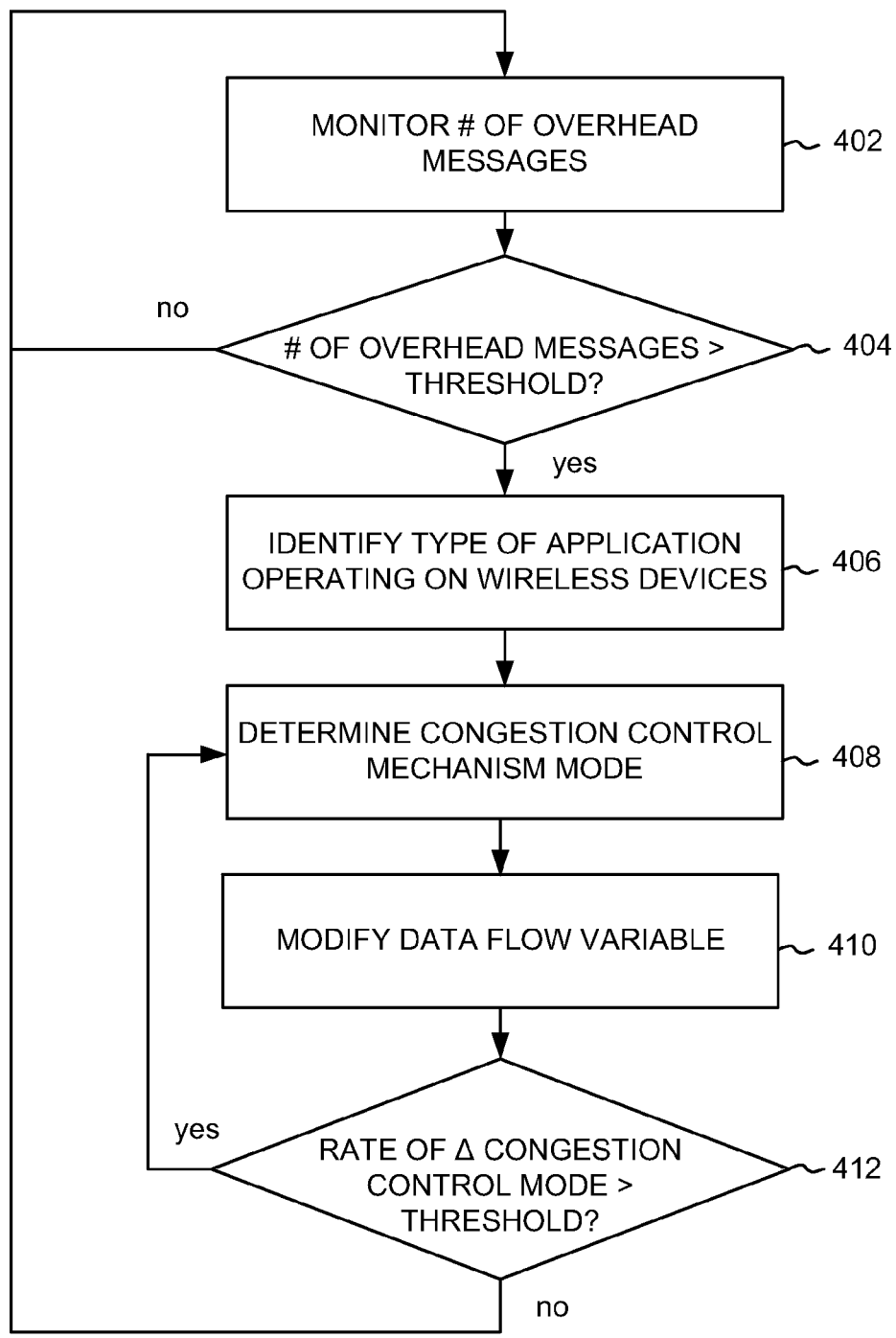
FIG. 4 illustrates another exemplary method of monitoring communications in a communication network.
Figure 5:
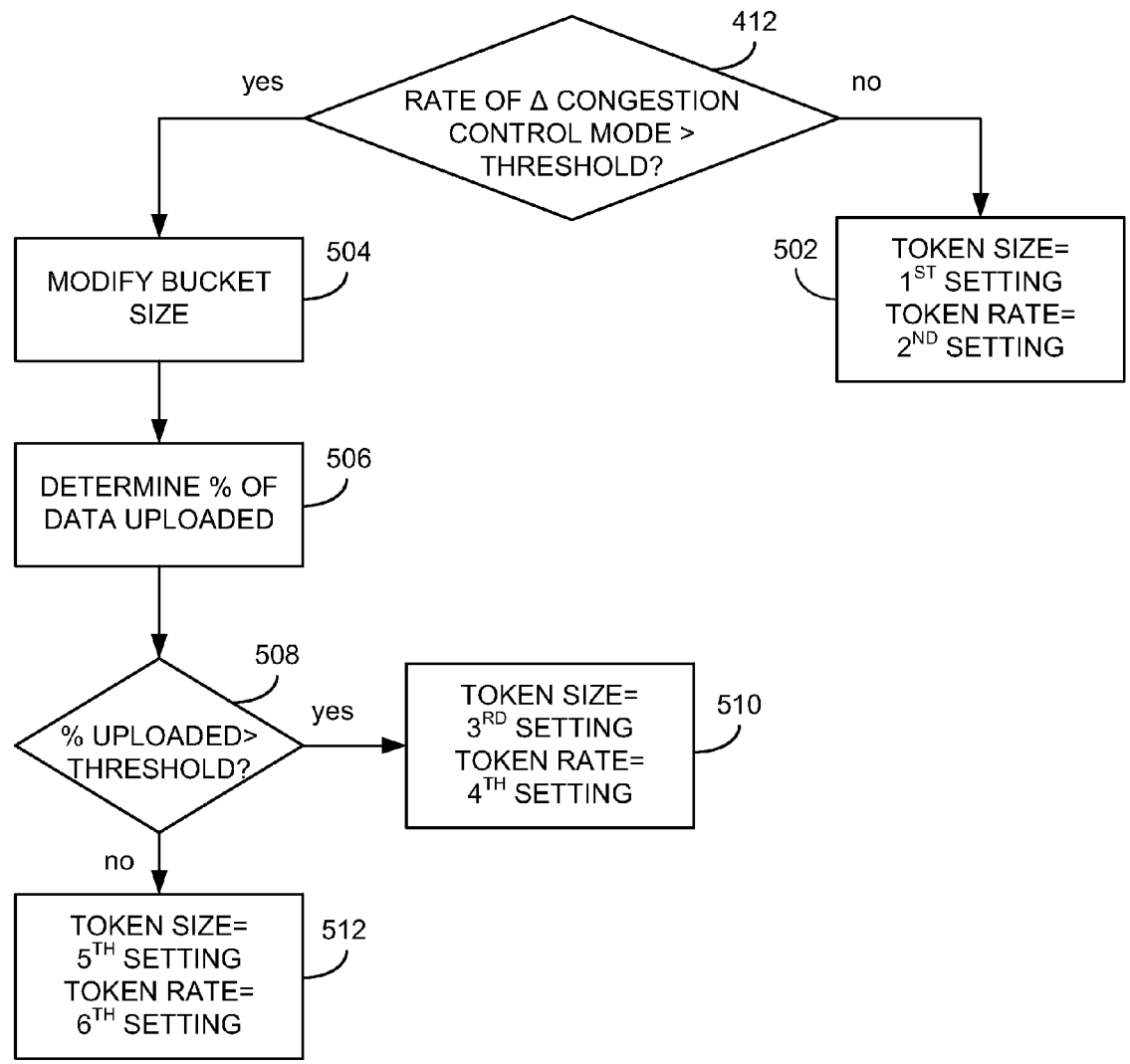
FIG. 5 illustrates another exemplary method of monitoring communications in a communication network.

FIGS. 4 and 5 illustrate exemplary methods of monitoring communications in a communication network. The methods will be discussed with reference to the exemplary communication system 300 illustrated in FIG. 3. However, the methods can be implemented with any suitable communication system. In addition, although FIGS. 4 and 5 depict steps performed in a particular order for purposes of illustration and discussion, the methods discussed herein are not limited to any particular order or arrangement. One skilled in the art, using the disclosures provided herein, will appreciate that various steps of methods can be omitted, rearranged, combined and/or adapted in various ways.

Wireless devices 302, 304, 306 can each send overhead messages when data is stored in a buffer of the respective wireless device 302, 304, 306 indicating that there is data waiting to be uploaded to the network. The number of overhead messages from each wireless device 302, 304, 306 can be monitored at 402. For example, any of the network elements, such as access node 314, controller node 318, and inspection node 322 can monitor the number of overhead messages over a period of time. The overhead messages can include any message relating to uploading data such as scheduling requests and buffer status reports.

The number of overhead messages received from each of the wireless devices 302, 304, 306 can be compared to a predetermined threshold at 404. The predetermined threshold can be based on various factors. For example, the predetermined threshold can be based on network traffic, network resources, types of applications operating on each of the wireless devices 302, 304, 306, etc. In addition, the predetermined threshold can be the same for all of the wireless devices 302, 304, 306 or it can be different for each device 302, 304, 306.

When the number of overhead messages received from the wireless devices 302, 304, 306 exceeds the predetermined threshold, the type of application operating on each of the wireless devices 302, 304, 306 can be identified at 406. For example the type of applications can include best effort applications that use TCP protocols for uploading data. In an exemplary embodiment, the best effort applications can engage in frequent file uploading of messages, pictures, email, etc.

In addition, TCP-flow information can be determined such that a congestion control mechanism mode can be determined in 408. TCP-flow information can include any information relating to the data flow to and from the wireless devices 302, 304, 306. For example, TCP-flow information can include the type of application operating on the wireless devices 302, 304, 306, a TCP congestion window size from the TCP header, an uploading file size, and/or the amount of data already uploaded from the buffer of each wireless device.

At least one variable of a data flow mechanism can be modified at 410 based on the congestion control mechanism mode and the type of application operating on each of the wireless devices 302, 304, 306. For example, a token size, a token rate, a bucket size, and/or a packet generation rate of a token bucket algorithm can be modified.

After at least one variable of the data flow mechanism is modified, the congestion control mode can be monitored to determine a rate of change in the congestion control mode. In 412, the rate of any change in the congestion control mode can be compared to a predetermined threshold. For example, the threshold can be set to reflect a rapid increase in a control window size such as exponentially.

When the rate of the congestion control mode exceeds the threshold, the mode of the congestion control mechanism can be determined. For example, when the rate of the congestion window increases exponentially, the mode can be determined to be in the slow-start mode. When the rate of the congestion window does not exceed the threshold, it can be determined that the congestion control mechanism is in a congestion avoidance mode or a constant rate phase mode.

In an alternative embodiment illustrated in FIG. 5, when the rate of change of the congestion control mode is greater than a threshold in 412, a token size of the data flow mechanism can be set to a first setting and a token rate of the data flow mechanism can be set to a second setting in 502. For example, the token size of a token bucket algorithm can be set to one message segment size and the token rate can be set to a large value to allow data from the wireless devices 302, 304, 306 to be sent rapidly.

When the rate of change of the congestion control mode is less than a threshold, a bucket size of the data flow mechanism can be modified in 504. For example, the bucket size of a token bucket algorithm can be set based on resources available in the network such as RF resources.

A percentage of data already uploaded from each wireless device can be determined in 506 and that percentage of uploaded data can be compared to a threshold in 508. When the uploaded percentage exceeds the threshold, a token size of the data flow mechanism can be set to a third setting and the token rate can be set to a fourth setting in 510. For example, the token size of the token bucket algorithm can be set to one message segment size and the token rate can be set to a large value such that the remaining buffered data can be sent rapidly and the last packets in the buffer can be prevented from being held in the buffer indefinitely.

When the percentage of data already uploaded is less than the threshold, a token size of the data flow mechanism can be set to a fifth setting and the token rate set to a sixth setting in 512. For example, the token size of the token bucket algorithm can be set to equal the congestion control window size and the token rate can be set to a small value such that the rate of overhead messages is reduced. After it is determined that the percentage of the uploaded data is less than the predetermined threshold and the token size is set to the fifth setting and the token rate is set to the sixth setting, a rate of overhead delay can be monitored and the token rate can be further modified to adjust of any latency larger than the requirements of the applications operating on the wireless devices 302, 304, 306. When a large number of wireless devices are determined as having an data uploaded percentage less than the threshold, the token rate of each wireless device can be modified to prevent overhead messages from being sent from a plurality of wireless devices simultaneously. In addition, the congestion control mechanism mode can be further monitored to determine a change in the mode. When the congestion control mechanism mode changes, for example from congestion-avoidance mode to slow start mode, due to dropping packets during transmission, the token bucket size can be modified accordingly.

Figure 6:
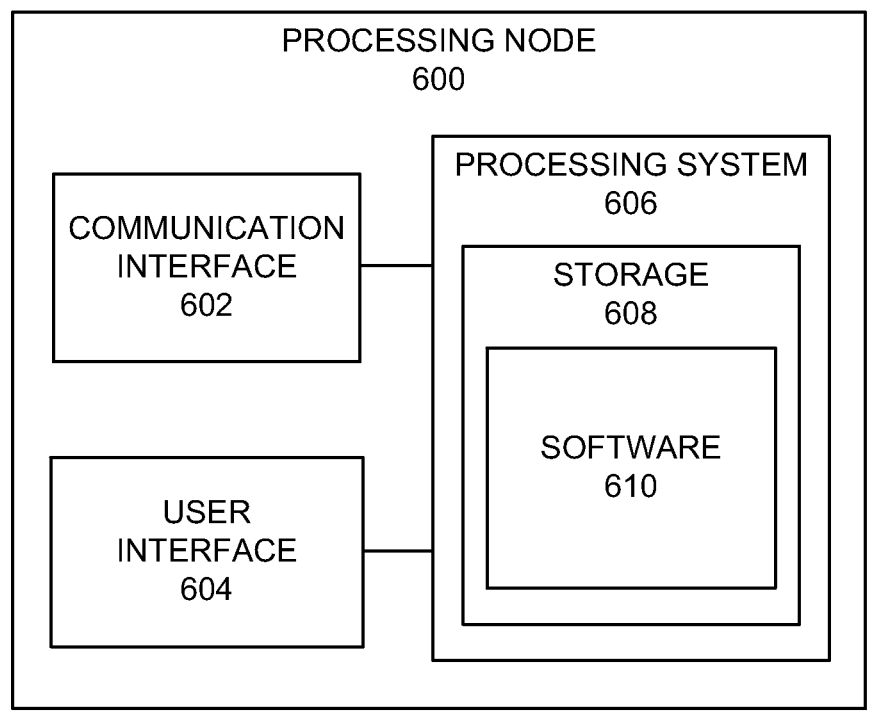
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 314, controller nodes 106, 318, and inspection node 322. Processing node can also be an adjunct or component of a network element, such as an element of access nodes 104, 314, controller nodes 106, 318, and inspection node 322. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of monitoring communications in a communication network, comprising:

monitoring a rate of overhead messages received from a wireless device over the communication network, wherein the rate of overhead messages received comprises a number of overhead messages received over a period of time;

comparing the monitored rate of overhead messages received from the wireless device to a predetermined threshold rate of overhead messages for the period of time;

identifying a type of application operating on the wireless device when the monitored rate of overhead messages received exceeds the predetermined threshold rate of overhead messages;

determining a congestion control mechanism mode for the wireless device when the rate of overhead messages received from the wireless device exceeds the predetermined threshold rate of overhead messages; and modifying a variable of a data flow mechanism for the wireless device based on the type of identified application operating on the wireless device and the determined congestion control mechanism mode for the wireless device.

2. The method as in claim 1, further comprising:
modifying the rate of overhead messages received from the wireless device based on the variable of the data flow mechanism.

3. The method as in claim 2, wherein the rate of overhead messages received from the wireless device is modified such that a packet delay is within a range less than a logout threshold.

4. The method as in claim 1, further comprising:
monitoring the rate of overhead messages received from each of a plurality of wireless devices; and
modifying the variable of the data flow mechanism based on the identified type of application operating on each wireless device and the determined congestion control mechanism mode for each wireless device.

5. The method as in claim 1, wherein the overhead messages comprise scheduling requests and buffer status reports.

6. The method as in claim 1, wherein the congestion control mechanism mode comprises one of a slow start mode, a congestion avoidance mode, and a constant rate mode.

7. The method as in claim 1, wherein the data flow mechanism is a token bucket algorithm.

8. The method as in claim 1, wherein the variable of the data flow mechanism comprises at least one of a token generation rate, a token size, a bucket size, and a packet generation rate.

9. The method as in claim 1, wherein the variable of the data flow mechanism is modified when the type of application operating on the wireless device is a best effort application.

10. A method of monitoring a number of overhead messages in a communication network, comprising:
receiving overhead messages from a plurality of wireless devices at an access node over the communication network and monitoring a number of overhead messages received from each of the plurality of wireless devices over a period of time;
comparing the monitored number of overhead messages received from each of the plurality of wireless devices over the period of time to a predetermined threshold number of overhead messages for each of the plurality of wireless devices for the period of time;
identifying a type of application operating on one or more wireless devices from among the plurality of wireless devices when the number of overhead messages received from the one or more wireless devices over the period of time exceeds the predetermined threshold number of overhead messages for the period of time;

determining a congestion control mechanism mode for each the one or more wireless devices when the monitored number of overhead messages received from each of the one or more wireless devices over the period of time exceeds the predetermined threshold number of overhead messages for the period of time;

modifying a variable of a data flow mechanism for each of the one or more wireless devices based on the identified type of application operating on each of the one or more wireless devices and the determined congestion control mechanism mode for each the one or more wireless devices; and modifying the number of overhead messages received from each of the one or more wireless devices based on the modified variable of the data flow mechanism for each of the one or more wireless devices.

11. The method as in claim 10, wherein the predetermined threshold number of overhead messages is based on the type of application operating on each of the plurality of wireless devices during the period of time.

12. The method as in claim 10, further comprising:
monitoring the congestion control mechanism mode for each of the plurality of wireless devices; and
modifying the variable of the data flow mechanism for at least one wireless device from among the plurality of wireless devices when a change in the monitored congestion control mechanism mode is detected for the at least one wireless device.

13. The method as in claim 10, wherein the congestion control mechanism mode comprises one of a slow start mode, a congestion avoidance mode, and a constant rate mode.

14. The method as in claim 10, wherein the variable of the data flow mechanism comprises at least one of a token generation rate, a token size, a bucket size, and a packet generation rate.

15. The method as in claim 10, wherein the data flow mechanism is a token bucket algorithm.

16. The method as in claim 10, wherein the variable of the data flow mechanism is modified when the type of application operating on the wireless device is a best effort application.

17. A communication system, comprising:
a processing node configured to
monitor a rate of overhead messages received from a wireless device over the communication network, wherein the rate of overhead messages received comprises a number of overhead messages received over a period of time;
compare the monitored rate of overhead messages received from the wireless device to a predetermined threshold rate of overhead messages for the period of time;
identify a type of application operating on the wireless device when the monitored rate of overhead messages received from the wireless device exceeds the predetermined threshold rate of overhead messages for the period of time;
determine a congestion control mechanism mode for the wireless device when the monitored rate of overhead messages received exceeds the predetermined threshold rate of overhead messages for the period of time; and
modify a variable of a data flow mechanism for the wireless device based on the identified type of application operating on the wireless device and the determined congestion control mechanism mode for the wireless device.

18. The system as in claim 17, wherein the processing node is further configured to
monitor the rate of overhead messages from each of a plurality of wireless devices; and modify the variable of the data flow mechanism for each of the plurality of wireless devices based on the type of application operating on each wireless device and the congestion control mechanism mode for each wireless device.

19. The system as in claim 17, wherein the congestion control mechanism mode comprises one of a slow start mode, a congestion avoidance mode, and a constant rate mode and the data flow mechanism is a token bucket algorithm.

20. The system as in claim 17, wherein the variable of the data flow mechanism is modified when the type of application operating on the wireless device is a best effort application.

* * * * *